United States Patent
Wang et al.

(10) Patent No.: US 8,199,539 B2
(45) Date of Patent: *Jun. 12, 2012

(54) ADAPTIVE CONTROL FOR TRANSITION BETWEEN MULTIPLE MODULATION MODES IN A SWITCHING POWER CONVERTER

(75) Inventors: Xiaoyan Wang, Milpitas, CA (US); Liang Yan, Milpitas, CA (US); Junjie Zheng, Santa Clara, CA (US); John William Kesterson, San Jose, CA (US); Clarita Poon, Pleasanton, CA (US)

(73) Assignee: iWatt Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/198,358

(22) Filed: Aug. 4, 2011

(65) Prior Publication Data

US 2011/0286248 A1    Nov. 24, 2011

Related U.S. Application Data

(63) Continuation of application No. 12/398,878, filed on Mar. 5, 2009, now Pat. No. 8,018,743.

(51) Int. Cl.
*H02M 3/335* (2006.01)
*H02M 3/157* (2006.01)

(52) U.S. Cl. .................. 363/21.18; 323/284; 363/21.13

(58) Field of Classification Search .......... 323/282–284; 363/21.04, 21.05, 21.1, 21.11, 21.12, 21.13, 363/21.18
See application file for complete search history.

(56) References Cited

U.S. PATENT DOCUMENTS

| | | | |
|---|---|---|---|
| RE37,609 E | 3/2002 | Bittner | |
| 6,434,021 B1 | 8/2002 | Collmeyer et al. | |
| 6,489,756 B2 * | 12/2002 | Kanouda et al. | 323/284 |
| 6,956,750 B1 | 10/2005 | Eason et al. | |
| 7,211,992 B2 * | 5/2007 | King | 323/283 |
| 7,605,576 B2 * | 10/2009 | Kanakubo | 323/285 |
| 8,018,743 B2 * | 9/2011 | Wang et al. | 363/21.18 |
| 2006/0273772 A1 | 12/2006 | Groom | |
| 2007/0257647 A1 * | 11/2007 | Chen et al. | 323/282 |
| 2008/0067994 A1 | 3/2008 | Kesterson et al. | |
| 2008/0112193 A1 | 5/2008 | Yan et al. | |
| 2008/0203989 A1 * | 8/2008 | Bacchi et al. | 323/284 |
| 2009/0079408 A1 * | 3/2009 | Qiao et al. | 323/283 |
| 2010/0164455 A1 * | 7/2010 | Li et al. | 323/283 |

OTHER PUBLICATIONS

PCT International Search Report and Written Opinion, PCT Application No. PCT/US2010/023219, Apr. 12, 2010, seven pages.

* cited by examiner

*Primary Examiner* — Adolf Berhane
*Assistant Examiner* — Fred E Finch, III
(74) *Attorney, Agent, or Firm* — Fenwick & West LLP (57) ABSTRACT

In a switching power converter, PWM mode and PFM mode are separated into two independent control sections with the control voltage range in each control section determined independently. Each of the PWM and PFM modulation modes cannot operate continuously beyond its boundaries, thereby forming a control gap between the two control sections within which no continuous operation is allowed. In order to supply a load condition within the control gap, the power supply operates at the two boundaries of the control gap. Transition between PWM and PFM modes occurs fast, with low output voltage ripple. No limitation needs to be imposed on the control voltage range in each of the PWM and PFM control sections, because the control parameters in the PWM and PFM control sections need not be matched to one another, due to separation of the PWM and PFM modes by the control gap.

13 Claims, 7 Drawing Sheets

ADAPTIVE CONTROL FOR TRANSITION BETWEEN MULTIPLE MODULATION MODES IN A SWITCHING POWER CONVERTER

CROSS REFERENCE TO RELATED APPLICATIONS

This application is a continuation application of, and claims priority under 35 U.S.C. §120 from, U.S. patent application Ser. No. 12/398,878, filed on Mar. 5, 2009, which is incorporated by reference herein in its entirety.

BACKGROUND OF THE INVENTION

1. Field of the Invention

The present invention relates to transitioning between different modulation modes in switching power converters (also referred to as switched mode power supplies) to reduce output voltage ripple and overshoot and undershoot during such transition.

2. Description of the Related Arts

In switched mode power supplies, power loss results from either current conduction loss or switching loss in the power switch. Under heavy load conditions, current is high and thus conduction loss is the dominating factor. However, under light load conditions, current is low and thus switching loss is the dominating factor.

To improve the light load efficiencies of switching power converters, multiple modulation modes are used to control the switching power converter at different output current (load) conditions. For example, in order to optimize the power efficiency for all load conditions, a switching power converter typically uses PWM (pulse width modulation) in heavy load conditions and PFM (pulse frequency modulation) in light load conditions.

In PWM mode, the switching power converter is controlled with a constant switching frequency, and therefore a constant switching period, but varies the duty cycle of the power switch in the switching power converter. Duty cycle refers to the fraction (often expressed as a percentage) of the switching period during which the power switch is ON. For example, a PWM switching scheme may have a switching frequency of 100 kHz and therefore a switching period of 10 μs. Hence, for a duty cycle of 30%, the power switch would be ON for 3 μs and OFF for 7 μs of each switching period. Under PWM control, the switching power converter regulates the output voltage based on feedback signals by adjusting the duty cycle of the power switch, but maintains a constant switching frequency.

In PFM mode, the switching power converter is controlled with the power switch being turned on with pulses of a set duration, but the duty cycle of the power switch is controlled with a variable switching frequency, and therefore a variable switching period. For example, a PFM switching scheme may turn on the power switch for 5 μs of each switching period, but vary the switching frequency between 40 kHz and 130 kHz. A switching frequency of 40 kHz would correspond to a switching period of 25 μs and therefore a duty cycle of 20%, whereas a switching frequency of 130 kHz would correspond to a switching period of 7.7 μs and therefore a duty cycle of 65%. Hence, under PFM control, the switching power converter regulates the output voltage based on feedback signals by adjusting the frequency and period of the power switch, but the power switch is ON for the same duration or for the durations corresponding to the same voltage-second product during each switching period.

Figure 1A:
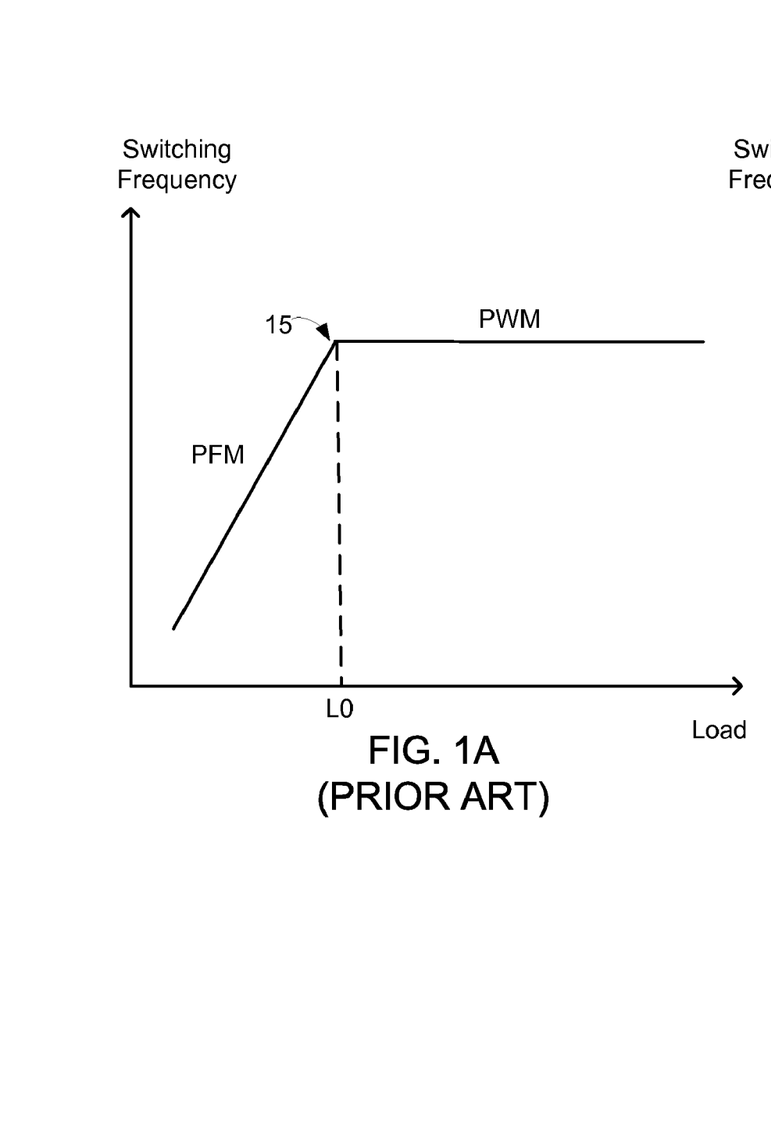
FIG. 1A illustrates a conventional control scheme for a switching power converter.

FIG. 1A illustrates a conventional control scheme for a switching power converter. The switching power converter operates with two operating modes, PWM and PFM. When the output current (i.e., load) of the power converter is larger than load level (output current level) L0, the power converter operates in PWM mode with a constant switching frequency. However, when the load is smaller than load level L0, the power converter operates in PFM mode with the switching frequency decreasing as the load decreases.

With more than one modulation modes combined in the power converter control scheme, there exist transition points between the different operating modes. Note that the transition between PWM and PFM modes in the conventional control scheme of FIG. 1A is continuous. At load point L0, the power converter is at the transition point between the PWM and PFM modes, and can operate in PWM mode, PFM mode, or run back and forth between the PWM and PFM modes. If the power converter runs back and forth between PWM and PFM modes, the output voltage ripple typically becomes high. This is because PWM and PFM modes have to respond to the same control voltage while modulating different variables: pulse width and period. A perfect transition between the PWM and PFM modes requires that not only the control voltage requirements from the two operating modes are identical at the transition point 15, but also that the slope of the change in control voltage responding to the change in load is identical, which imposes a tough requirement for power converter design. Any discrepancy will cause the output voltage ripple to be higher than a normal, desired level.

Figure 1B:
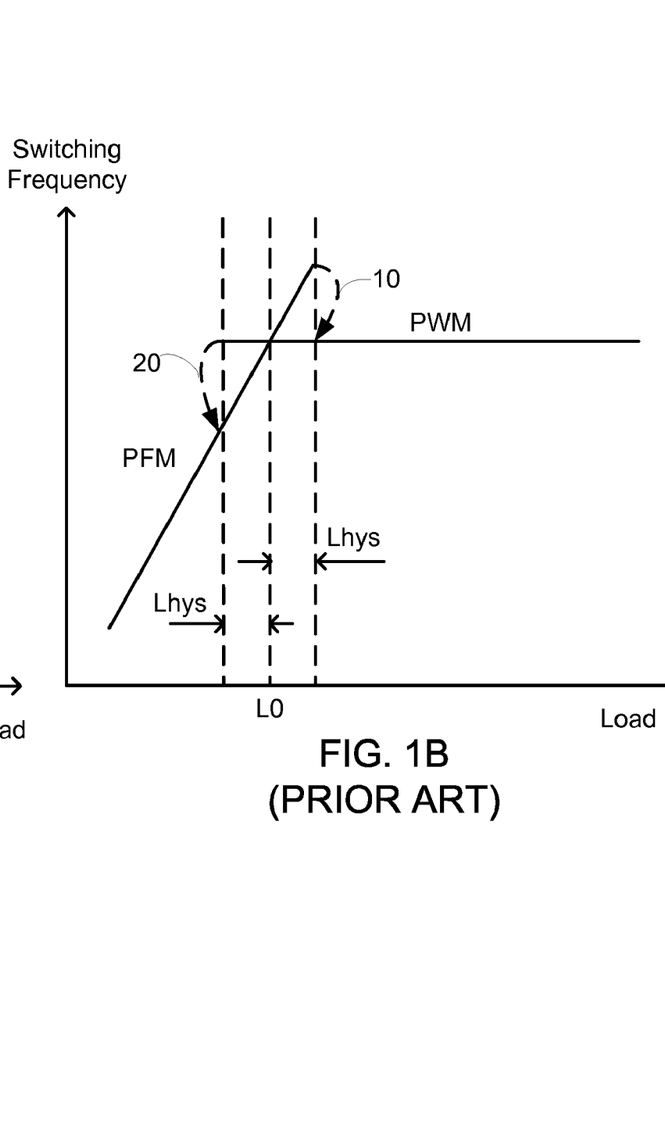
FIG. 1B illustrates another conventional control scheme for a switching power converter.

FIG. 1B illustrates another conventional control scheme for a switching power converter. In this control scheme, a time lag is introduced for transitions between operating modes. That is, once the power converter enters an operation mode, it has to wait for the control loop to settle down before exiting that operation mode. In addition, control voltage hysteresis is introduced to minimize transition between operation modes. That is, the control voltage has to go beyond a level that represents a defined hysteresis Lhys in the load (output current) in order to transition into the other operating mode. For example, as shown in FIG. 1B, the load of a switching power converter in PWM mode would have to drop beyond load L0−Lhys to transition 20 to PFM mode, and the load of a switching power converter in PFM mode would have to increase beyond L0+Lhys to transition 10 to PWM mode. As a result, output voltage ripple caused by transition between operation modes can be reduced.

By introducing hysteresis, if the load does not deviate out of the hysteresis range, the power supply can operate stably in one modulation mode. However, if the hysteresis range is large, output voltage overshoot or undershoot may appear during the transition between operation modes, because the hysteresis may force the control voltage in one operation mode to go higher or lower than the control voltage in the other operation mode, resulting in a step function of the control voltage after the transition to the new operating mode. On the other hand, if the hysteresis range is too small, it may not be enough to prevent oscillation between operating modes. As a result, output voltage ripple may be higher due to not only imperfect slope matching, but also the hysteresis itself.

Another disadvantage of the control of FIGS. 1A and 1B is the wide control voltage range. For example, in a Flyback type switching power converter, the output power can be expressed as $$P_{out} = \frac{(V_{in}T_{on})^2}{2L_m T_p}\eta,$$

where $P_{out}$ is the output power, $V_{in}$ is the rectified input voltage, $T_{on}$ is the turn-on time of a power MOSFET switch, $L_m$ is the magnetizing inductance of the transformer, $T_p$ is the switching period, $\eta$ is the conversion efficiency. If using VinTon control in PWM mode, the control variable is VinTon. If PWM control covers the load from 10% to 100%, the load ratio is 100%:10%=10:1. The control voltage ratio can be derived as $\sqrt{10}$:1, or 3.16:1. In PFM mode, the control variable is Tp. If PFM covers the load range 10% to 0.5%, the control voltage ratio is 50:1. Thus, a much larger control voltage ratio needs to be supported by the PFM control. The wider control voltage range requirement in PFM mode may cause difficulty in implementation, particularly by the limitation that the highest control voltage in PFM mode cannot exceed the lowest control voltage in PWM mode.

SUMMARY OF THE INVENTION

Embodiments of the present invention include a method for adaptive transition between modulation modes of a switching power converter, in which PWM mode and PFM mode are separated into two independent control sections with the control voltage range in each control section determined independently and the boundary of each control section being clearly defined. Each of the PWM and PFM modulation modes cannot operate continuously beyond its boundaries, thereby forming a control gap between the two control sections. No continuous operation is allowed within the control gap. In order to supply the load condition within the control gap, the power supply operates at the two boundaries of the control gap.

More specifically, a method of operating a switching power converter comprises operating the switching power converter in pulse frequency modulation mode in a first output current range higher than a first output current level and lower than a second output current level, operating the switching power converter in pulse width modulation mode in a second output current range higher than a third output current level and lower than a fourth output current level, the third output current level being higher than the second output current level. The switching power converter is not operated in either the pulse frequency modulation mode or the pulse width modulation mode between the second output current level and the third output current level, thereby forming the control gap.

Transition from the pulse width modulation mode to the pulse frequency modulation mode occurs if the output voltage of the switching power converter increases beyond a reference voltage plus a predetermined hysteresis voltage and the output current level of the switching power converter decreases below the third output current level. Transition from the pulse frequency modulation mode to the pulse width modulation mode occurs if the output voltage of the switching power converter decreases beyond a reference voltage minus a predetermined hysteresis voltage and the output current level of the switching power converter increases above the second output current level.

The present invention has the advantage that transition between PWM and PFM modes occurs fast, with low output ripple caused during the transition. No limitation needs to be imposed on the control voltage range in each of the PWM and PFM control sections, because the control parameters in the PWM and PFM control sections need not be matched to one another, due to the separation of the PWM and PFM modes by the control gap.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

According to various embodiments of the present invention, a method for adaptive transition between modulation modes of a switching power converter is provided, in which PWM mode and PFM mode are separated into two independent control sections with the control voltage range in each control section determined independently and the boundary of each control section being clearly defined. Each of the PWM and PFM modulation modes cannot operate continuously beyond its boundaries, thereby forming a control gap between the two control sections. No continuous operation is allowed within the control gap.

Figure 2A:
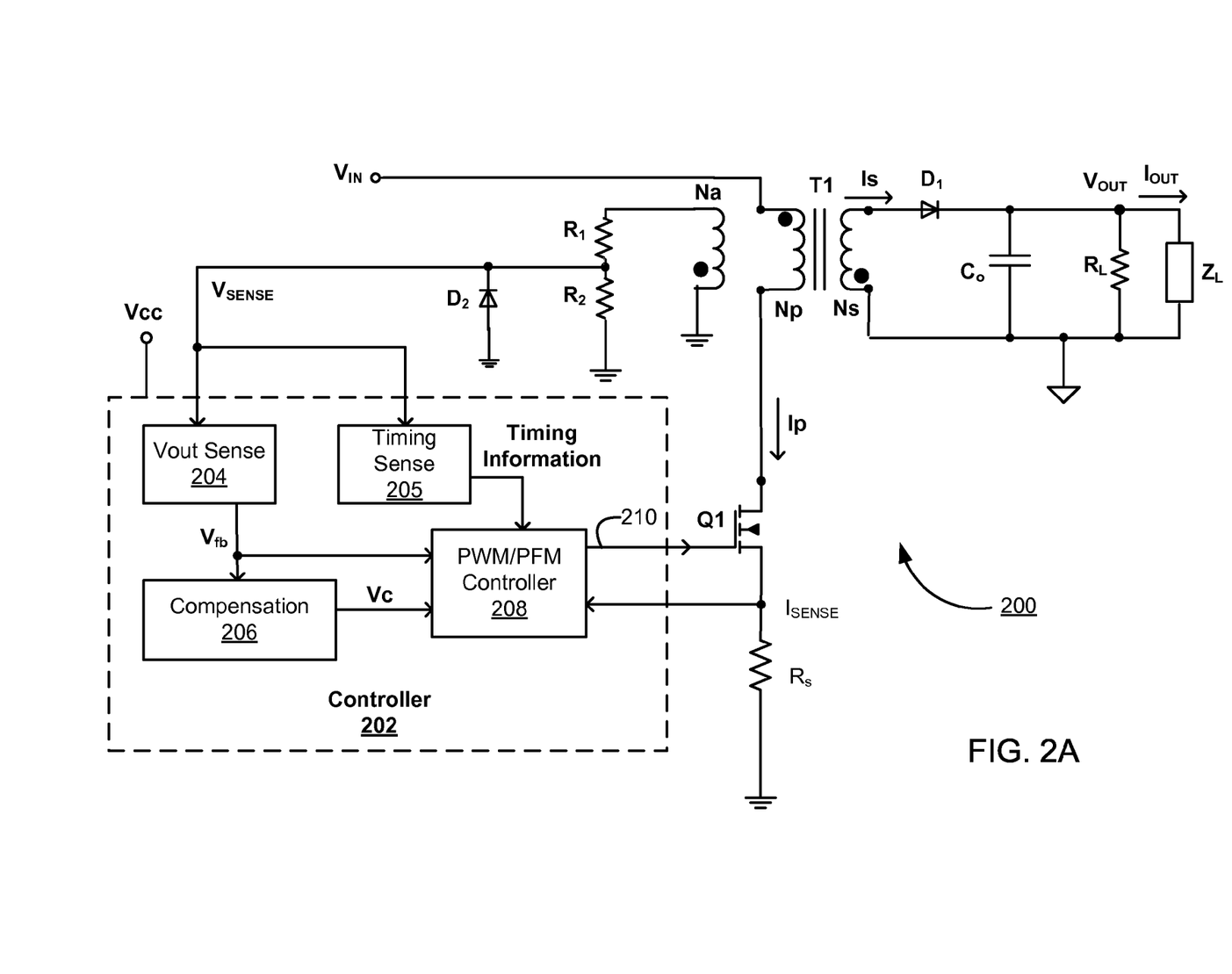
FIG. 2A illustrates a flyback type AC-DC switching power converter, according to one embodiment of the present invention.

Turning to the figures, FIG. 2A illustrates a flyback type AC-DC switching power converter, according to one embodiment of the present invention. The power converter 200 includes a transformer T1, diode $D_1$, a capacitor $C_o$, a power MOSFET switch Q1, resistors $R_1$, $R_2$, and a controller 202. Controller 202 generates the output drive signal 210 that drives switch Q1. The AC power is received from an AC power source (not shown) and is rectified to provide the regulated DC input voltage $V_{IN}$. The input power is stored in transformer T1 while the switch Q1 is turned on, because the diode $D_1$ becomes reverse biased when the switch Q1 is turned on. The rectified input power is then transferred to the load $Z_L$ across the capacitor $C_o$ while the switch Q1 is turned off, because the diode $D_1$ becomes forward biased when the switch Q1 is turned off. Diode $D_1$ functions as an output rectifier and capacitor $C_o$ functions as an output filter. The resulting regulated output voltage $V_{OUT}$ is delivered to the load $Z_L$. Resistor $R_L$ is a pre-load that is typically used for stabilizing the output at no load conditions.

Controller 202 includes a timing sense module 205, a Vout sense module 204, a loop compensation module 206, and a PWM/PFM control module 208. Controller 202 can employ any one of a number of well known modulation techniques, such as pulse-width-modulation (PWM) or pulse-frequency-modulation (PFM), to control the ON and OFF states and duty cycles of power switch Q1. Thus, PWM/PFM control module 208 generates appropriate switch drive pulses 210 to control the on-times and off-times of power switch Q1 and regulate the output voltage $V_{OUT}$, using a feedback loop based on the sensed output voltage $V_{OUT}$ and the sensed primary side current Ip in previous switching cycles of the switching power converter, in a variety of operation modes including PWM and PFM modes.

The voltage $I_{SENSE}$ is used to sense the primary current Ip through the primary winding Np and switch Q1 in the form of a voltage across sense resistor $R_S$. The voltage $I_{SENSE}$ is compared in PWM/PFM controller 208 with a voltage Vipk corresponding to a peak primary current to implement peak current mode switching to limit the primary current Ip when it reaches the peak current threshold value. The output voltage $V_{OUT}$ is reflected across auxiliary winding Na of transformer T1, which is input to the Vout sense module 204 and timing sense module 205 as the voltage $V_{SENSE}$ via a resistive voltage divider comprised of resistors $R_1$ and $R_2$. Vout sense module 204 determines the feedback voltage $V_{fb}$ by sampling the voltage $V_{SENSE}$ at the end of the transformer reset time in each switching cycle of the power converter 200 and scaling the sampled voltage to a comparable level for comparison with the target regulated output voltage. The feedback voltage $V_{fb}$ is provided to compensation module 206 and PWM/PFM controller 208. Compensation module 206 uses the feedback voltage $V_{fb}$ to determine the control voltage Vc, which is input to PWM/PFM controller 208. As will be explained below, control voltage Vc is a parameter indicating the extent of power supply loading, i.e., how much energy has to be transferred to the load per switching cycle in order to maintain the required output voltage. Timing sense module 205 also detects a variety of timing parameters of the switching power converter 200 based on the $V_{SENSE}$ signal, including the switching period (Tp), transformer reset time (Trst), etc., which are also input to PWM/PFM controller. Based on the detected timing parameters and the control voltage Vc, PWM/PFM controller 208 determines which operation mode (PWM or PFM) to apply to control the power converter 200, and generates appropriate switch drive signals 210 under the selected operation mode (PWM or PFM). As will be explained in more detail below with reference to FIGS. 4A, 4B, and 4C, PWM/PFM controller 208 selects either PWM mode or PFM mode for control of the power converter 200 based upon the load (output current) of switching power converter 200 and the sensed output voltage $V_{OUT}$. As explained above, the control voltage Vc is used as a proxy representing the level of load (output current) of the power converter 200, and the feedback voltage $V_{fb}$ or $V_{SENSE}$ may be used as a proxy representing the actual output voltage $V_{OUT}$.

Figure 2B:
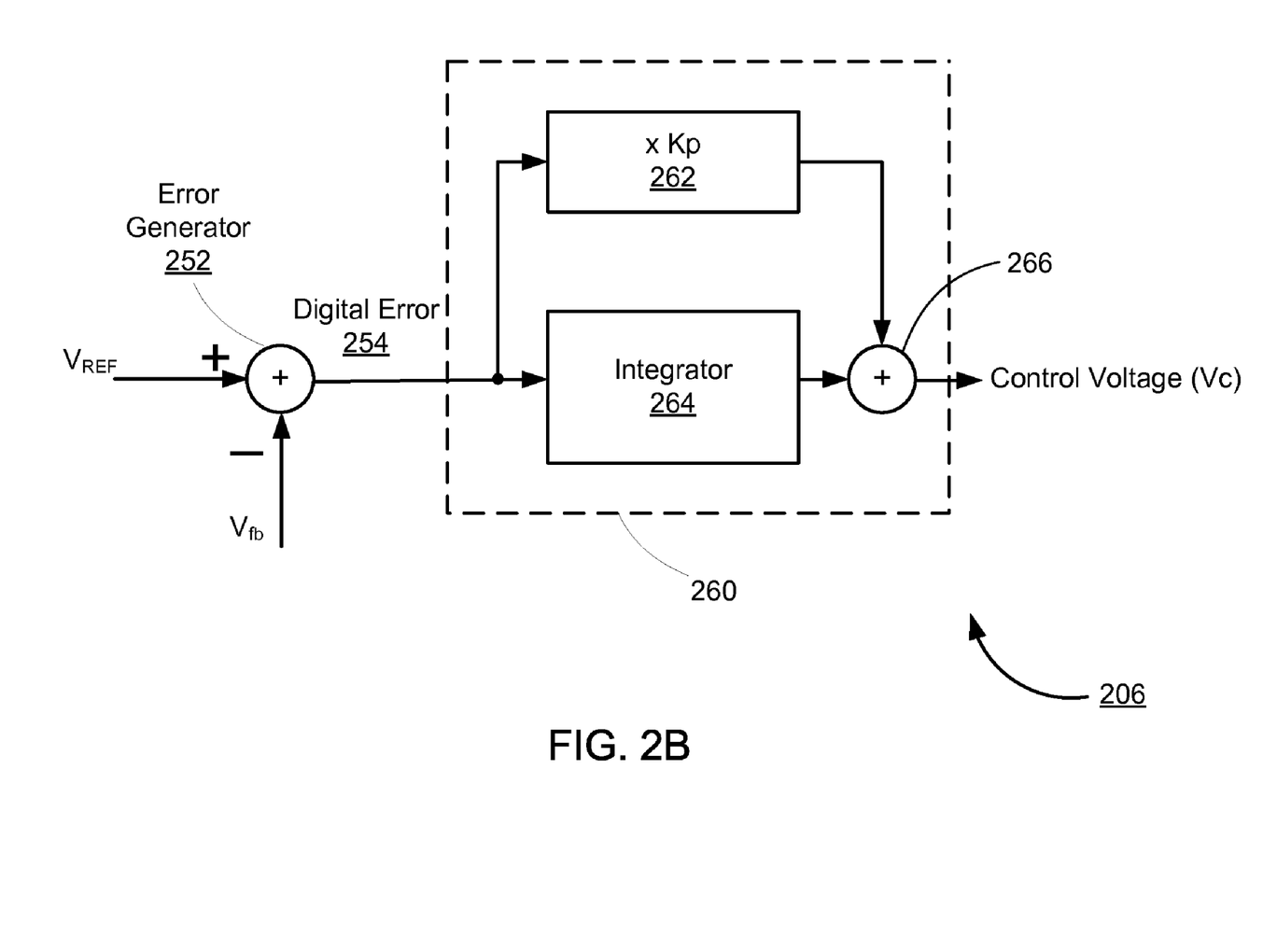
FIG. 2B illustrates an example of circuitry of the compensation module in FIG. 2A generating the control voltage Vc.

FIG. 2B illustrates an example of circuitry of the compensation module in FIG. 2A generating the control voltage Vc. Inside the compensation module 206 is a digital error generator 252 that determines the difference between digital voltage feedback value $V_{fb}$ and a digital reference voltage value $V_{REF}$ corresponding to a target (regulated) output voltage. The resulting digital error signal 254 is input to a P-I function (proportional-integral function) 260 comprised of an integrator 264 and a proportional block 262. Integrator 264 integrates digital error signal 254 over all previous switching cycles or a predetermined number of previous switching cycles, whose output is added to a scaled value (scaled by coefficient Kp in proportional block 262) of the digital error signal 254 in adder 266 to generate control voltage Vc. Thus, control voltage Vc indicates the extent of power supply loading (level of output current), i.e., how much energy has to be transferred to the load per switching cycle in order to maintain the required output voltage. In general, an increasing control voltage Vc indicates that the output voltage $V_{OUT}$ is lower than desired and should be increased, and a decreasing control voltage Vc indicates that the output voltage $V_{OUT}$ is higher than desired and should be decreased. Therefore, if error signal 254 indicates that the output voltage $V_{OUT}$ ($V_{fb}$) is lower than desired, then control voltage Vc will be increased by P-I function 260, which will in turn cause the on-time (Ton) of the switch Q1 to increase and thereby transfer more energy to the load $Z_L$ per switching cycle to maintain the required output regulation voltage. If error signal 254 indicates that the output voltage $V_{OUT}$ ($V_{fb}$) is higher than desired, then the control voltage Vc will be decreased by P-I function 260, which will in turn cause the on-time (Ton) of the switch Q1 to decrease or the switching frequency of the switch Q1 to decrease and thereby transfer less energy to the load $Z_L$ per switching cycle to maintain the required output regulation voltage. Although FIG. 2B illustrates one example of a digital implementation of circuitry for generating the control voltage Vc, other digital or analog implementations can be used to generate a similar parameter reflecting the extent of power supply loading.

Figure 3:
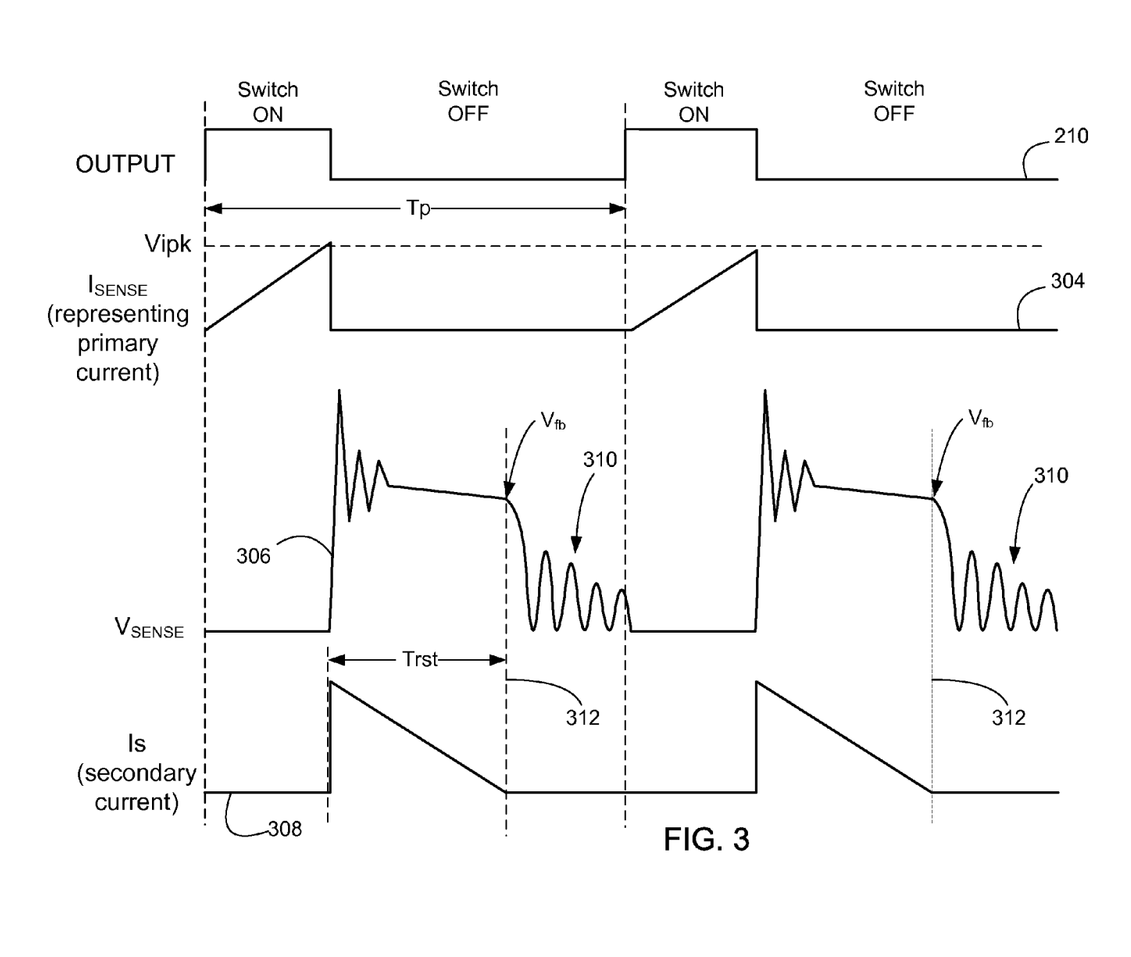
FIG. 3 illustrates the operational waveforms of the switching power converter of FIG. 2A, according to one embodiment of the present invention.

FIG. 3 illustrates the operational waveforms of the switching power converter of FIG. 2A, according to one embodiment of the present invention. Referring to FIG. 3 together with FIG. 2A, controller 202 outputs a control signal 210 (OUTPUT, in current form), which defines the ON and OFF states of power switch Q1. The primary current $I_p$ through switch Q1 and primary winding Np is represented as the voltage, $I_{SENSE}$ 304. When control signal 210 is high and thus power switch Q1 is in the ON state, primary current (represented by $I_{SENSE}$) 304 ramps up. The rate of ramp up of primary current ($I_{SENSE}$) 304 is predominantly based on the input line voltage $V_{IN}$ and the magnetizing inductance Lm of primary winding Np. When power switch Q1 is in the ON state, output rectifier diode $D_1$ is reversed biased, and thus $V_{SENSE}$ voltage 306 (representing the output voltage $V_{OUT}$) is ideally zero and output current (secondary current) Is 308 is also equal to 0 A. Thus, while power switch Q1 is in the ON state, energy is stored in power transformer T1 but not delivered to the load $Z_L$ at the output.

When primary current ($I_{SENSE}$) 304 reaches the peak current mode threshold Vipk, control signal 210 becomes low, and the power switch Q1 is switched to the OFF state. As a result, output rectifier diode $D_1$ becomes forward biased and energy stored in transformer T1 is delivered to the secondary winding Ns based on the turns ratio (Np/Ns) between the primary winding Np and the secondary winding Ns. As the energy stored in power transformer T1 is delivered to the secondary winding Ns, secondary current Is 308 spikes up and then starts to ramp down. Similarly, the $V_{SENSE}$ voltage 306 also spikes up and then slowly ramps down. When all of the energy stored in power transformer T1 is delivered to the secondary side Ns, secondary current Is 308 becomes equal to 0 A, which point is also referred to as the transformer reset point 312. The period Trst during which secondary current Is spikes up and then reaches zero is referred to as the transformer reset time Trst. Also, the complete period of the OUTPUT signal 210 is referred to as the switching period Tp. Note that the feedback voltage $V_{fb}$ (explained above with reference to FIG. 2A) is sampled from $V_{SENSE}$ at the transformer reset point 312. If power switch Q1 remains in the OFF state beyond the transformer reset point 312, the Vsense voltage exhibits high frequency ringing, generally occurring during voltage ringing period 310, with the ringing decaying. Then, controller 202 (PWM/PFM module 208) will determine the next turn-on time of power switch Q1 based on the selected operation mode (PWM or PFM) and generate a high control signal 210 to turn on the power switch Q1 for the next switching cycle, and the above described operation is repeated in the next and additional subsequent switching cycles.

Figure 4A:
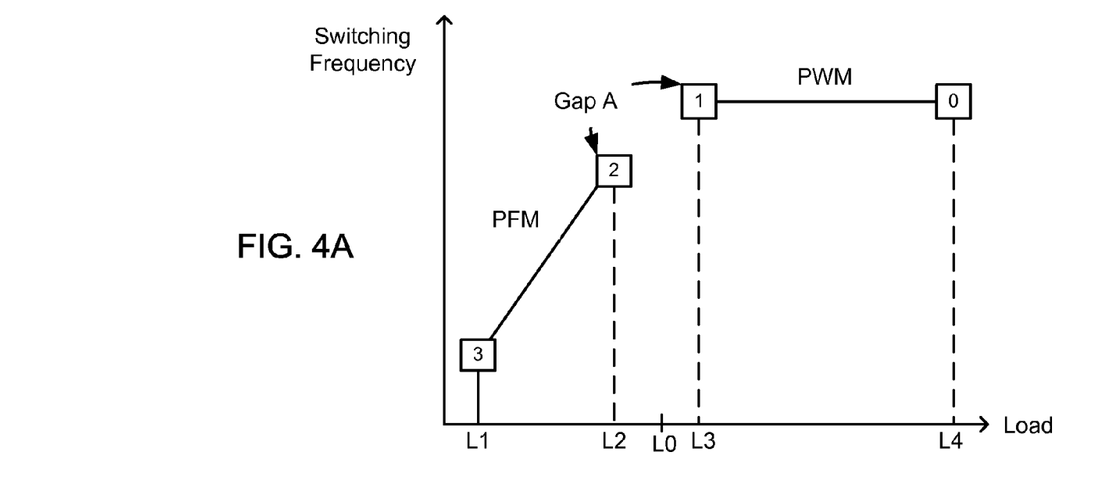
FIG. 4A and FIG. 4B illustrate transition between operation modes in a switching power converter, according to one embodiment of the present invention.
Figure 4B:
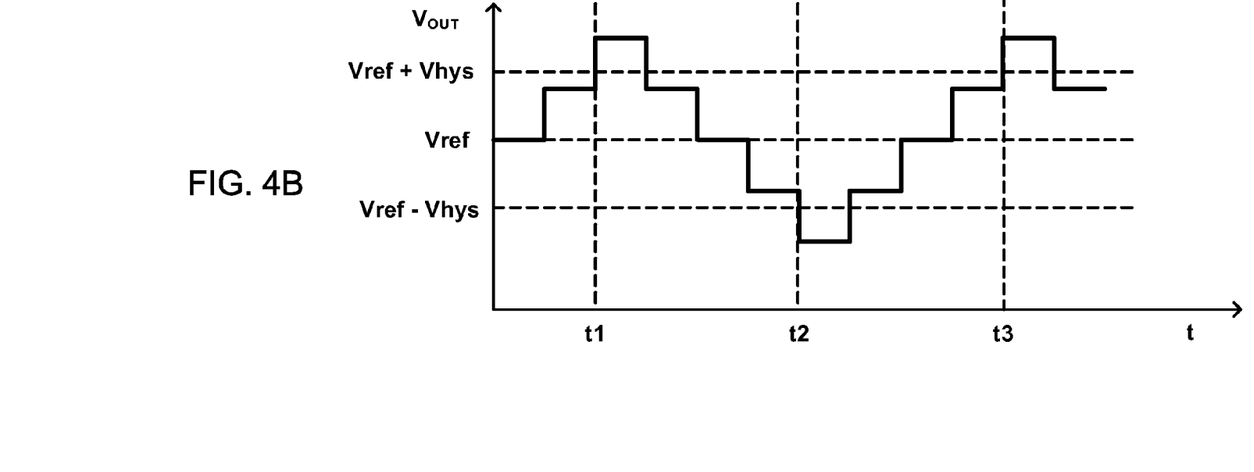

FIG. 4A and FIG. 4B illustrate transition between operation modes in a switching power converter, according to one embodiment of the present invention. Referring to FIG. 4A together with FIG. 2A, PWM/PFM controller 208 operates the power converter 200 in PWM mode with constant switching frequency, when the load level (output current) is between L3 and L4 (between operating point 1 and operating point 0). When the load level is between L1 and L2, PWM/PFM controller 208 operates the power converter 200 in PFM mode with the switching frequency decreasing as the load level decreases.

In a flyback type switching power converter, the output power is determined by:

$$P_{out} = \frac{(V_{in}T_{on})^2}{2L_m T_p}\eta,$$

where $P_{out}$ is the output power, $V_{in}$ is the rectified input voltage, $T_{on}$ is the turn-on time of a power MOSFET switch Q1, $L_m$ is the magnetizing inductance of the transformer T1, $T_p$ is the switching period, $\eta$ is the conversion efficiency. In the PWM control section between operating points 0 and 1, the switching period Tp is determined independently from the VinTon control. Therefore, the lowest regulation power limit for PWM control exists at operating point 1 by the lowest allowed PWM control voltage. In the PFM control section between operating points 2 and 3, VinTon is determined independently from the Tp control. Therefore, the highest regulation power limit for PFM control exists at operating point 2 by the highest allowed PFM control voltage.

Note that there is a control gap A between load levels L2 and L3. Specifically, PWM/PFM controller 208 controls the operation of switching power converter 200 such that PWM control does not continue beyond its PWM control voltage limit, i.e., below operating point 1 (load L3). To this end, a VinTon boundary corresponding to load L3 is specified for the PWM control section and the power converter 200 is controlled not to operate beyond such VinTon boundary. Similarly, PWM/PFM controller 208 controls the operation of switching power converter 200 such that PFM control does not continue beyond its PFM control voltage limit, i.e., above operating point 2 (load L2). To this end, a Tp boundary corresponding to L2 is specified for the PFM control section and the power converter 200 is controlled not to operate beyond such Tp boundary. As long as there is a guarantee that operating point 1 regulates higher output power than operating point 2, VinTon at operating point 2 can be independently specified in the PFM section, and Tp at operating point 1 can be independently specified in the PWM section.

The transition between PWM and PFM modes is made based on two variables: the output voltage $V_{OUT}$ and the load condition. FIG. 4B illustrates how the output voltage $V_{OUT}$ is used to determine whether to transition between PWM and PFM modes in the switching power converter 200. The sensed output voltage $V_{OUT}$ can be in analog or digital format. FIG. 4B shows the situation where the output voltage $V_{OUT}$ is in digital format. In one embodiment, PWM/PFM controller 208 controls the switching power converter 200 to transition from PWM control to PFM control if two conditions are met, i.e., (1) the sensed output voltage sense $V_{OUT}$ goes above the reference voltage Vref plus a predetermined hysteresis voltage Vhys, i.e., Vref+Vhys, such as at time t1, and (2) the load condition is such that operating point 1 is reached and tends to go below operating point 1. The reference voltage Vref corresponds to the target output voltage of the switching power converter 200. Also in one embodiment, PWM/PFM controller 208 controls the switching power converter 200 to transition from PFM control to PWM control if two conditions are met, i.e., (1) the sensed output voltage sense $V_{OUT}$ goes below the reference voltage Vref minus a predetermined hysteresis voltage Vhys, i.e., Vref−Vhys, such as at time t2, and (2) the load condition is such that operating point 2 is reached and tends to go above operating point 2.

With this control technique, a control gap A is provided between load levels L2 and L3, and the power converter 200 does not operate in either PWM mode or PFM mode at the load levels between load levels L2 and L3. For example, assume that the load level of the switching power converter 200 dropped from L3 to L0 for some reason. As a result, output voltage $V_{OUT}$ would increase because the load decreased to maintain constant output power. Eventually $V_{OUT}$ would increase above Vref+Vhys, and control voltage Vc would decrease to a load level corresponding to lower than operating point 1 through the circuitry of FIG. 2B because the output voltage $V_{OUT}$ increased to a level higher than desired. Thus, control of the switching power converter 200 would jump to operating point 2 (PFM mode). If control of the switching power converter 200 stays at operating point 2, output voltage $V_{OUT}$ would decrease because the load level L0 is higher than what the output power at operating point 2 can support. Eventually $V_{OUT}$ would decrease below Vref−Vhys, and control voltage Vc would increase to a load level corresponding to higher than operating point 2 through the circuitry of FIG. 2B because the output voltage $V_{OUT}$ is decreased to a level lower than desired. Thus, control of the switching power converter 200 would jump to operating point 1 (PWM mode). This process is repeated such that the control of the switching power converter 200 jumps back and forth between operating point 2 (PFM mode) and operating point 1

(PWM mode) at the control boundaries of each operating mode, when the load level is at L0 between load levels L2 and L3. The switching power converter 200 is not operated in any operation mode (PWM or PFM) between the load levels L2 and L3. The output power of the switching power converter 200 is determined by the ratio of the number of the occurrences at each boundary of the control gap, i.e., at operation points 1 and 2.

According to such control method of FIGS. 4A and 4B, the output ripple caused by the transition between PWM and PFM modes is determined by the output voltage hysteresis boundaries (2×Vhys). The output capacitor $C_o$ is typically high enough to smooth the output ripple. Note that hysteresis is applied (added to or subtracted from) to the output voltage according to the present invention, rather than to the control voltage Vc as in conventional hysteresis methods. There is no need for a control voltage hysteresis, according to the present invention. Therefore, the output voltage ripple is clearly defined by the reference voltage hysteresis. Once the output voltage goes beyond this range, the operation mode control either increases or reduces the power level by operating at the other side of the control gap A, which response is as fast as one switching cycle. Another advantage of the control according to the present invention is that there is no direct correlation between the control voltages from the PWM section and the PFM section. The range of control voltage in each control section can be determined independently, as long as the boundary operating points 1 and 2 do not vary. This provides the advantage of allowing wider range of control voltage used for each control section (PWM and PFM), which allow easy implementation and design of the switching power converter.

Figure 5:
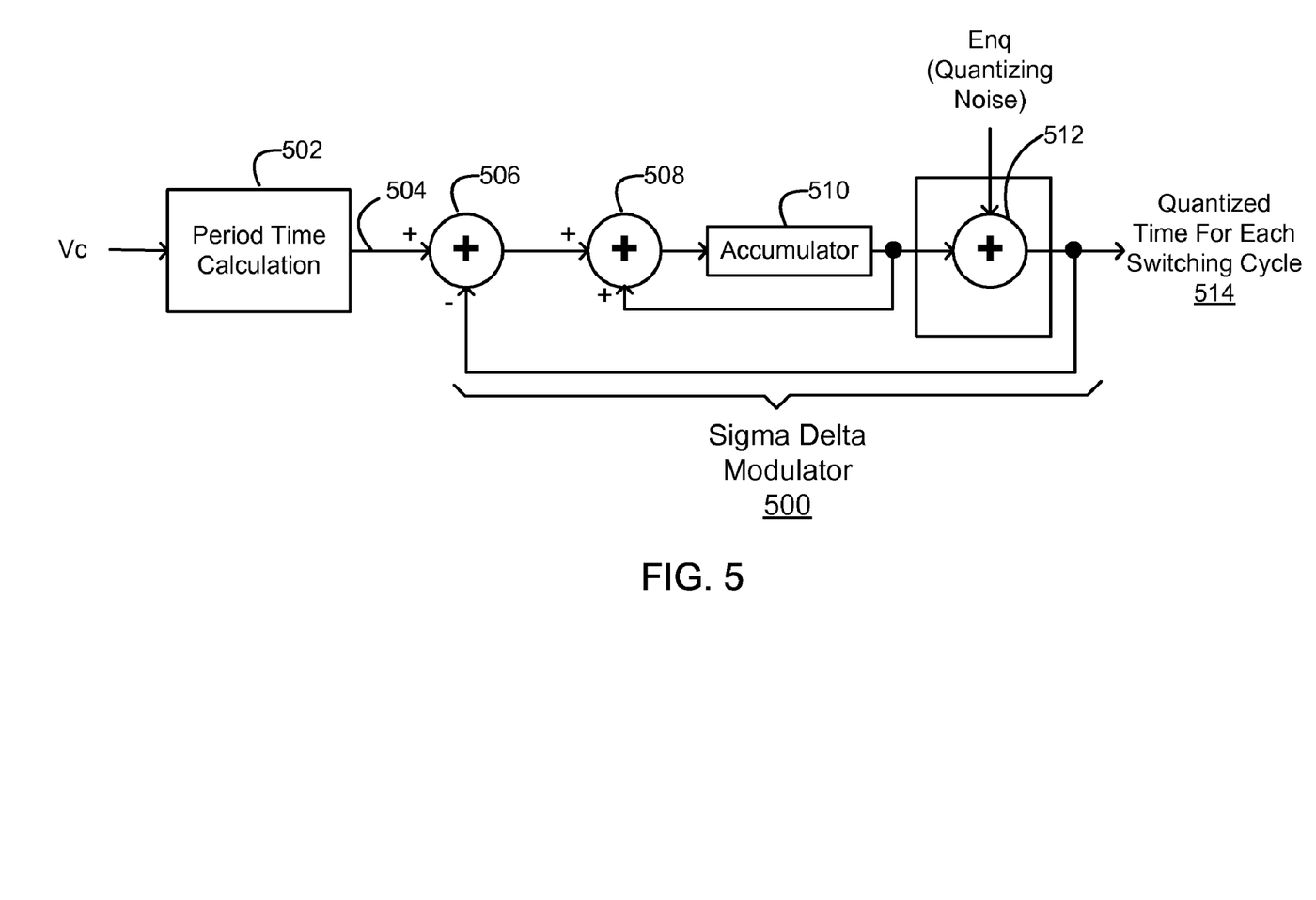
FIG. 5 illustrates how to control the transition between multiple operating points using a sigma delta modulator, according to another embodiment of the present invention.

In another embodiment, transition between multiple operating points can be controlled if the period time can be directly calculated according to the control voltage Vc. FIG. 5 illustrates how to control the transition between multiple operating points using a sigma delta modulator, according to another embodiment of the present invention. The period time calculation module 502 uses the control voltage Vc to determine the time period 504 for load level L0 (FIG. 4A). The time period 504 could be used to drive a first order sigma delta modulator 500 comprised of adders 506, 508, 512 and accumulator 510. The result 514 of that calculation is then quantized to one of the defined operating points, i.e. operating points 1 and 2 (FIG. 4A) using quantizing noise (Enq). Sigma delta modulator 500 will insure that the average of the quantized time 514 over a number of switching cycles will be equal to the originally calculated value. Although this method of FIG. 5 is more complex and not necessary in all applications, it has two advantages. First, the quantizing noise (Enq) is shaped by the sigma delta operation so that most of the noise is in the high frequency range, where it will be filtered out in the final output thereby reducing the AC ripple caused by the jumping back and forth between the quantization steps. Secondly, it removes the requirement for any hysteresis in the switching decision process. With this method, the noise is determined by the quantization level (Enq), the sigma delta over-sampling factor, and the noise shaping.

Figure 4C:
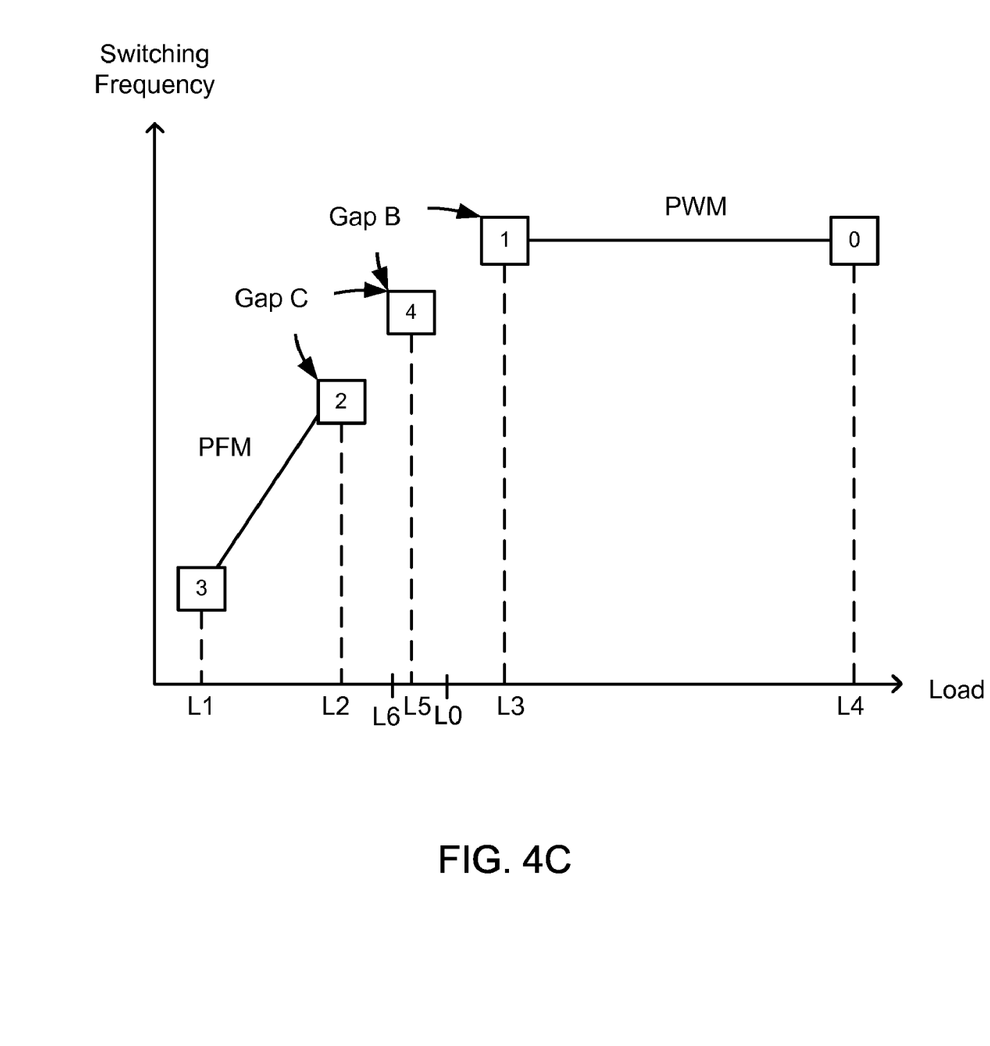
FIG. 4C illustrates transition between operation modes in a switching power converter, according to another embodiment of the present invention.

It is also possible to insert more than one discrete operating point between the control boundaries, to allow shorter steps between the power levels. FIG. 4C shows one such example, illustrating transition of operation modes in a switching power converter, according to another embodiment of the present invention. The adaptive transition control can also allow discrete power control level between control boundaries. In FIG. 4C, the gap between operating point 1 and operating point 2 is separated into two shorter gaps B and C with a discrete operating point 4. In this format, the first transition is made between operating point 1 and operating point 4, and the second transition is made between operating point 4 and operating point 2. The conditions for the transition in each gap (Gap B and Gap C) is the same as those described above with reference to FIG. 4B. In other words, each gap (Gap B and Gap C) is treated like Gap A for transition as explained above with reference to FIGS. 4A and 4B.

For example, referring to FIG. 4C, assume that the load level of the switching power converter 200 dropped from L3 to L for some reason. As a result, output voltage $V_{OUT}$ would increase because the load decreased to maintain constant output power. Eventually $V_{OUT}$ would increase above Vref+Vhys, and control voltage Vc would decrease to a load level corresponding to lower than operating point 1 through the circuitry of FIG. 2B because the output voltage $V_{OUT}$ increased to a level higher than desired. Thus, control of the switching power converter 200 would jump to the closest operating point, which is operating point 4. Then, at operating point 4, $V_{OUT}$ would decrease because the load level L0 is higher than what the output power at operating point 4 can support. Eventually, output voltage $V_{OUT}$ would decrease below Vref−Vhys, and the control of the switching power converter 200 would jump back to operating point 1. Note the control voltage Vc is not used to determine a change in operating points within the control gaps (Gap B and Gap C) and only the output voltage $V_{OUT}$ is used as the sole determinator for change in operating points within the control gaps (Gap B and Gap C). Thus, control of the switching power converter 200 would jump back to operating point 1 (PWM mode). This process is repeated such that the control of the switching power converter jumps back and forth between operating point 1 (PWM mode) and operating point 4, when the load level is at L0 between load levels L5 and L3. The switching power converter 200 is not operated in either PWM mode or PFM mode between the load levels L5 and L3.

On the other hand, assume that the load level of the switching power converter 200 dropped from L3 to L6 for some reason. As a result, output voltage $V_{OUT}$ would increase because the load decreased to maintain constant output power. Eventually $V_{OUT}$ would increase above Vref+Vhys, and control voltage Vc would decrease to a load level corresponding to lower than operating point 1 through the circuitry of FIG. 2B because the output voltage $V_{OUT}$ increased to a level higher than desired. Thus, control of the switching power converter 200 would jump to the closest operating point, which is operating point 4. Then, at operating point 4, $V_{OUT}$ would increase because the load level L6 is lower than what the output power at operating point 4 can support. Eventually, output voltage $V_{OUT}$ would increase above Vref+Vhys, and the control of the switching power converter 200 would jump to operating point 2 (PFM mode). Note the control voltage Vc is not used to determine a change in operating points within the control gaps (Gap B and Gap C) and only the output voltage $V_{OUT}$ is used as the sole determinator for change in operating points within the control gaps (Gap B and Gap C). Then, at operating point 2, the output voltage $V_{OUT}$ would decrease, because the output power is lower than what is required to support the load at load L6. Eventually, the output voltage $V_{OUT}$ would decrease below Vref−Vhys and the control voltage Vc would increase beyond operating point 2. As a result control of the switching power converter jumps back to operating point 4. This process is repeated such that the control of the switching power converter 200 jumps back and forth between operating point 2 (PFM mode) and operating point 4, when the load level is at L6 between load levels L2 and L5. The switching power converter 200 is not operated in either PWM mode or PFM mode between the load levels L2 and L5.

The present invention has advantage that transition between PWM and PFM modes occurs fast, with low output voltage ripple caused during the transition. No limitation needs to be imposed on the control voltage range in each of the PWM and PFM control sections, because the control parameters in the PWM and PFM control sections need not be matched to other, due to the separation of the PWM and PFM modes by the control gap.

Upon reading this disclosure, those of skill in the art will appreciate still additional alternative designs for adaptive transition between operation modes in switching power converters. For example, although FIGS. 4A and 4C illustrate one or two control gaps between the PWM and PFM modes, a larger number of control gaps (3 or more) may be used. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

What is claimed is:

1. A method of operating a switching power converter, the method comprising:
   operating the switching power converter in pulse frequency modulation mode in a first output current range higher than a first output current level and lower than a second output current level;
   operating the switching power converter in pulse width modulation mode in a second output current range higher than a third output current level and lower than a fourth output current level, the third output current level being higher than the second output current level, and
   wherein between the second output current level and the third output current level, the switching power converter is operated in at least one of a plurality of discrete operating points, each discrete operating point associated with an operating frequency and a duty cycle of the switching power converter.

2. The method of claim 1, further comprising:
   transitioning from the pulse width modulation mode to the pulse frequency modulation mode if an output voltage of the switching power converter increases beyond a reference voltage plus a predetermined hysteresis voltage and an output current level of the switching power converter decreases below the third output current level.

3. The method of claim 1, further comprising:
   transitioning from the pulse frequency modulation mode to the pulse width modulation mode if an output voltage of the switching power converter decreases beyond a reference voltage minus a predetermined hysteresis voltage and an output current level of the switching power converter increases above the second output current level.

4. The method of claim 1, wherein a control gap is formed between the second output current level and the third output current level, the control gap including a first control gap corresponding to a third output current range higher than the second output current level and lower than a fifth output current level and a second control gap corresponding to a fourth output current range higher than the fifth output current level and lower than the third output current level, the fifth output current level corresponding to one of the plurality of discrete operating points of the switching power converter that is not based on the pulse width modulation mode and the pulse frequency modulation mode.

5. The method of claim 1, wherein transitioning between the plurality of discrete operating points of the switching power converter occurs solely based on an output voltage level of the switching power converter without regard to an output current level of the switching power converter, if the output current level of the switching power converter is between the second output current level and the third output current level.

6. The method of claim 1, further comprising lowering a switching frequency of the switching power converter in pulse frequency modulation mode as an output current level of the switching power converter decreases.

7. A switching power converter comprising:
   a switch configured to couple or de-couple an output of the switching power converter to or from an input voltage to the switching power converter; and
   a controller coupled to the switch and configured to control the on or off state of the switch, the controller operating the switching power converter by:
      operating the switching power converter in a pulse frequency modulation mode in a first output current range higher than a first output current level and lower than a second output current level;
      operating the switching power converter in a pulse width modulation mode in a second output current range higher than a third output current level and lower than a fourth output current level, the third output current level being higher than the second output current level, and
      wherein between the second output current level and the third output current level, the switching power converter is operated in at least one of a plurality of discrete operating points, each discrete operating point associated with an operating frequency and a duty cycle of the switching power converter.

8. The switching power converter of claim 7, wherein the controller transitions operation of the switching power converter from the pulse width modulation mode to the pulse frequency modulation mode if an output voltage of the switching power converter increases beyond a reference voltage plus a predetermined hysteresis voltage and an output current level of the switching power converter decreases below the third output current level.

9. The switching power converter of claim 7, wherein the controller transitions operation of the switching power converter from the pulse frequency modulation mode to the pulse width modulation mode if an output voltage of the switching power converter decreases beyond a reference voltage minus a predetermined hysteresis voltage and an output current level of the switching power converter increases above the second output current level.

10. The switching power converter of claim 7, wherein a control gap is formed between the second output current level and the third output current level, the control gap including a first control gap corresponding to a third output current range higher than the second output current level and lower than a fifth output current level and a second control gap corresponding to a fourth output current range higher than the fifth output current level and lower than the third output current level, the fifth output current level corresponding to one of the plurality of discrete operating points of the switching power converter that is not based on the pulse width modulation mode and the pulse frequency modulation mode.

11. The switching power converter of claim 7, wherein transitioning between the plurality of discrete operating points of the switching power converter occurs solely based on an output voltage level of the switching power converter without regard to an output current level of the switching power converter, if the output current level of the switching power converter is between the second output current level and the third output current level.

12. The switching power converter of claim 7, wherein the controller lowers a switching frequency of the switching power converter in the pulse frequency modulation mode as an output current level of the switching power converter decreases.

13. A method of operating a switching power converter, the method comprising:

operating the switching power converter in a first mode when the switching power converter is in a first output current range higher than a first output current level and lower than a second output current level;

operating the switching power converter in a second mode when the switching power converter is in a second output current range higher than a third output current level and lower than a fourth output current level, the third output current level being higher than the second output current level, and wherein between the second output current level and the third output current level, the switching power converter is operated in at least one of a plurality of discrete operating points, each discrete operating point associated with an operating frequency and a duty cycle of the switching power converter.

* * * * *